United States Patent Office 3,065,092
Patented Nov. 20, 1962

3,065,092
PROCESS FOR THE PRODUCTION OF COPPER PHTHALOCYANINE STABLE TO SEPARATION
Georg Geiger, Binningen, and Xaver Pfister, Riehen, Switzerland, assignors to Sandoz Ltd. (a/k/a Sandoz A.G.), Basel, Switzerland
No Drawing. Filed Apr. 25, 1960, Ser. No. 24,259
Claims priority, application Switzerland May 5, 1959
13 Claims. (Cl. 106—176)

The stability to separation of the pigments used for coloring lacquers is becoming increasingly important. The term refers to the separation of the white and the colored pigment particles which occurs in some nitrocellulose lacquers after standing for a short time. This phenomenon has an undesirable effect when the lacquer is poured or cast on the surface to be coated, or when the articles to be coated are dipped in the lacquer. If separation has taken place in the standing lacquer, the coatings formed by pouring or dipping techniques exhibit a much lighter shade than coatings applied by spraying and those of lacquers which are free from this type of flocculation. This phenomenon represents above all a loss of dyestuff. Moreover, as a result of separation, the coatings produced by pouring or dipping show unpleasant mottled and/or stippled color effects.

This invention relates to a process for the production of finely divided copper phthalocyanines which may be halogenated and are stable to separation. The process consists in the admixture of a reaction product of a halogenomethylated copper phthalocyanine which may contain halogen atoms linked to the nucleus, with a tertiary organic base to finely divided, if desired halogenated, copper phthalocyanine, preferably $\beta$-copper phthalocyanine.

The admixture can be successfully accomplished with amounts of 1% to 30%, but it is preferable to employ an amount not exceeding 10% on the weight of the copper phthalocyanine.

The mixing of copper phthalocyanine, halogenated or unhalogenated, with the reaction product of a halogenomethylated copper phthalocyanine and a tertiary organic base is conducted preferably in aqueous suspension, if necessary with heating. Alternatively, the halogenomethylated copper phthalocyanine can first be mixed with the halogenated or unhalogenated copper phthalocyanine and the mixture then treated with a tertiary organic base, e.g. pyridine, quinoline, trimethylamine, dimethylcetylamine, dimethyllaurylamine, methyldicetylamine or methyldilaurylamine. The treatment of the mixture can also be accomplished by dispersing the mixing components in water in presence of a tertiary organic base at high temperature, e.g. 90–100° C.

The non-separating pigments can be isolated, when the components are dissolved in concentrated sulfuric acid by running the solution into ice-water, upon which the product is filtered off and washed neutral, or the aqueous suspension can be filtered off, or the tertiary organic bases washed out as chlorohydrates with water by filtration. Organic solvents which are volatile in steam are best eliminated by steam distillation.

The terms copper phthalocyanine which may be halogenated refer to copper phthalocyanine which may have a low halogen content, preferably 1 to 4 chlorine atoms per molecule of copper phthalocyanine; the halogenomethylated copper phthalocyanine is a copper phthalocyanine with 1 to 4 halogenomethyl groups, preferably 2 or 3 chloromethyl groups, or a copper phthalocyanine with a low content of chlorine linked to the nucleus, preferably 1 to 4 chlorine atoms, and with 1 to 4, but preferably 2 or 3, chloromethyl groups per molecule of copper phthalocyanine.

The copper phthalocyanines stable to separation which are obtained by the present process are employed primarily for coloring nitrocellulose lacquers, but they also fined employment for other purposes in the wide field of uses for pigment colors.

In the following examples the parts and percentages are by weight and the temperatures in degrees centigrade.

Example 1

The starting product, chlorinated copper phthalocyanine, is produced as follows:

240 parts of copper phthalocyanine are entered with stirring into 1440 parts of sulfuric acid monohydrate at a temperature below 60°. The mass is cooled to 0–5° and 150 parts of 25% oleum added, followed by 0.8 part of iodine. A jet of chlorine is conducted through the solution at the rate of approximately 5 parts per hour. After 7–10 hours a sample is taken and shows a chlorine content of 5.8%. The excess chlorine is then blown out by directing air through the solution.

24 parts of tri-(chloromethyl)-copper phthalocyanine are added to the reaction mass which is then heated to 60° and poured with thorough stirring into 10,000 parts of water. The precipitated pigment is filtered, washed neutral with water and suspended in 3000 parts of water with the subsequent addition of 100 parts of pyridine. After 16 hours' stirring at 90–95°, it is filtered with suction, washed with water and dried. The pigment obtained is stable to separation.

Example 2

100 parts of monochlorocopper phthalocyanine, precipitated from sulfuric acid, are suspended in 3000 parts of water. A mixture of 5 parts of tri-(chloromethyl)-copper phthalocyanine and 50 parts of pyridine which has been previously heated at 95–100° for 5 hours is added. The mass is stirred for 20 hours at 90–95°, the pigment then being filtered off, washed with water and dried. It is blue and stable to separation.

In this example it is possible to replace the 50 parts of pyridine by 50 parts of quinoline, trimethylamine, dimethylcetylamine, dimethyllaurylamine, methyldicetylamine or methyldilaurylamine. A pigment which is stable to separation is obtained.

Example 3

100 parts of monochlorocopper phthalocyanine precipitated from sulfuric acid are suspended in 3000 parts of water. To the suspension is added a mixture of 3 parts of monochloro-di-(chloromethyl)-copper phthalocyanine and 12 parts of pyridine which has been previously heated at 95–100° for 5 hours. The whole is stirred for 16 hours at 20°, after which the pigment is filtered off, washed with water and dried. The blue pigment obtained is stable to separation.

Example 4

150 parts of copper phthalocyanine and 600 parts of common salt are ground in a ball mill at 160° until the color strength and shade of $\beta$-copper phthalocyanine are attained. The mass is stirred into 3000 parts of hot water, filtered off, and the press cake washed free of salt with water. It is then stirred into 2000 parts of water. To this suspension is added a mixture of 1.5 parts of tri-(chloromethyl)-copper phthalocyanine and 7.5 parts of pyridine which has been previously heated at 95–100° for 5 hours on a water bath. The whole is stirred for 16 hours at room temperature, then the pigment is filtered off and the filter cake washed with water and dried. A blue pigment is obtained which is stable to solvents and does not separate in nitrocellulose lacquers.

Example 5

The procedure of Example 4 is followed, but the mixture of 1.5 parts of tri-(chloromethyl)-copper phthalocyanine and 7.5 parts of pyridine is replaced by a mixture of 3 parts of monochloro-di-(chloromethyl)-copper phthalocyanine and 15 parts of pyridine. The product is again a blue pigment which does not separate in nitrocellulose lacquers.

Having thus disclosed the invention what we claim is:

1. A process for the production of stabilized copper phthalocyanine pigments which comprises admixing with a copper phthalocyanine having from 0 to 4 halogen atoms in the aromatic nuclei, from 1 to 30%, calculated on the weight of the copper phthalocyanine, of a quaternary salt of one mole of a copper phthalocyanine having from 0 to 4 halogen atoms in the aromatic nuclei and from 1 to 4 halogenomethyl groups in the molecule and 1 to 4 moles of a tertiary organic base selected from the group consisting of pyridine, quinoline, trimethylamine, diethylcetylamine, dimethyllaurylamine, methyldicetylamine, and methyldilaurylamine.

2. A process according to claim 1, wherein the copper phthalocyanine is mixed with a quaternary salt of tri-(chloromethyl)-copper phthalocyanine with a tertiary organic base as defined in claim 1.

3. A process according to claim 1, wherein the copper phthalocyanine in the β-form is mixed with a quaternary salt of monochloro-di-(chloromethyl)-copper phthalocyanine with a tertiary organic base as defined in claim 1.

4. A process according to claim 1, in which the admixture is accomplished with an amount not exceedingly 10% on the weight of the copper phthalocyanine.

5. A process according to claim 1, in which β-copper phthalocyanine is used as a starting material.

6. A stable pigment composition consisting essentially of the product obtained by mixing with stirring (a) a copper phthalocyanine having from 0 to 4 halogen atoms in the molecule and (b) from 1 to 30% based on the weight of the copper phthalocyanine, of a polyquaternary salt of one mole of a copper phthalocyanine having from 0 to 4 halogen atoms in the aromatic nuclei and from 1 to 4 halogenomethyl groups in the molecule and 1 to 4 moles of a tertiary organic base selected from the group consisting of pyridine, quinoline, trimethylamine, diethylcetylamine, dimethyllaurylamine, methyldicetylamine, and methyldilaurylamine.

7. A stable pigment composition consisting essentially of the product obtained by stirring at room temperature (a) a chlorinated copper phthalocyanine having a chlorine content of about 1 to 4 chlorine atoms per molecule; and (b) a mixture of tri-(chloromethyl)-copper phthalocyanine, in an amount of about 1 to 30% based on the weight of (a), and pyridine heated, before admixture to (a), at about 95 to 100° C.; and by separation of the resulting pigment from the mother liquor.

8. A stable pigment composition consisting essentially of the product obtained by stirring at room temperature of (a) copper phthalocyanine in β-form, and (b) a mixture of tri-(chloromethyl)-copper phthalocyanine, in an amount of about 1 to 30% based on the weight of (a), and pyridine heated, before admixture to (a), at about 95 to 100° C.; and by separation of the resultant pigment from the mother liquor.

9. A stable pigment composition consisting essentially of the product obtained by stirring at room temperature (a) copper phthalocyanine in β-form, and (b) a mixture of monochloro-di-(chloromethyl)-copper phthalocyanine, in an amount of about 1 to 30% based on the weight of (a), and pyridine heated, before admixture to (a), at about 95 to 100° C.; and by separation of the resultant pigment from the mother liquor.

10. A stable pigment composition consisting essentially of the product obtained by stirring at about 90 to 95° (a) chlorinated copper phthalocyanine having about 1 to 4 chlorinations per molecule, (b) tri-(chloromethyl)-copper phthalocyanine, and (c) pyridine, and separation of the resulting pigment from the mother liquor.

11. Nitrocellulose lacquers which have been colored with the stable pigment composition defined in claim 6.

12. A stable pigment composition consisting essentially of the product obtained by stirring at room temperature (a) a member selected from the group consisting of copper phthalocyanine in the β-form and monochloro copper phthalocyanine, (b) from 1 to 30%, based on the weight of (a), of a polyquaternary salt of one mole of a member selected from the group consisting of monochloro-di-(chloromethyl) copper phthalocyanine and tri(chloromethyl) copper phthalocyanine and from 1 to 4 moles of a tertiary organic base selected from the group consisting of pyridine, quinoline, trimethylamine, dimethylcetylamine, dimethyllaurylamine, methyldicetylamine and methyldilaurylamine, heated, before admixture to (a), at about 90° to 100° C., and by separation of the resultant pigment from the mother liquor.

13. A stable pigment composition consisting essentially of the product obtained by stirring at room temperature (a) monochloro copper phthalocyanine, and (b) tri-(chloromethyl) copper phthalocyanine, in an amount of about 1 to 30%, based on the weight of (a), and dimethyllaurylamine, heated, before admixture with (a), at about 95° to 100° C.; and by separation of the resultant pigment from the mother liquor.

References Cited in the file of this patent

UNITED STATES PATENTS

| | | |
|---|---|---|
| 2,713,005 | Baunsgaard et al. | July 12, 1955 |
| 2,933,505 | Jackson | Apr. 19, 1960 |